United States Patent
Mester et al.

(10) Patent No.: US 10,374,729 B2
(45) Date of Patent: Aug. 6, 2019

(54) ANTENNA ALIGNMENT TOOL AND METHOD

(71) Applicant: FreeWave Technologies, Inc., Boulder, CO (US)

(72) Inventors: Timothy G. Mester, Longmont, CO (US); Patrick I. Lazar, San Jose, CA (US)

(73) Assignee: FreeWave Technologies, Inc., Boulder, CO (US)

( * ) Notice: Subject to any disclaimer, the term of this patent is extended or adjusted under 35 U.S.C. 154(b) by 235 days.

(21) Appl. No.: 15/430,125

(22) Filed: Feb. 10, 2017

(65) Prior Publication Data
US 2018/0234192 A1    Aug. 16, 2018

(51) Int. Cl.
| | |
|---|---|
| *G01B 11/26* | (2006.01) |
| *H04B 17/12* | (2015.01) |
| *G06K 9/00* | (2006.01) |
| *H04M 1/725* | (2006.01) |
| *H04B 17/23* | (2015.01) |
| *H04B 17/27* | (2015.01) |
| *H04M 1/05* | (2006.01) |
| *H01Q 1/24* | (2006.01) |

(52) U.S. Cl.
CPC ......... *H04B 17/12* (2015.01); *G06K 9/00671* (2013.01); *H04B 17/23* (2015.01); *H04B 17/27* (2015.01); *H04M 1/72522* (2013.01); *H01Q 1/246* (2013.01); *H04M 1/05* (2013.01)

(58) Field of Classification Search
CPC ......... H01B 17/21; H01B 17/12; H01B 17/23
USPC ........................................... 33/286
See application file for complete search history.

(56) References Cited

U.S. PATENT DOCUMENTS

| | | | |
|---|---|---|---|
| 6,967,593 B2 * | 11/2005 | Carroll ................ | G08G 1/0965 250/334 |
| 7,718,941 B2 | 5/2010 | Austin et al. | |
| 2006/0092286 A1 * | 5/2006 | Velhal ................ | H04N 5/23203 348/211.3 |
| 2007/0227020 A1 * | 10/2007 | Barany ................ | A42B 3/0433 33/354 |
| 2009/0021447 A1 | 1/2009 | Austin et al. | |
| 2013/0040594 A1 * | 2/2013 | Vilhar .................. | G01R 29/10 455/226.4 |
| 2014/0168012 A1 | 6/2014 | Mankowski et al. | |
| 2015/0223195 A1 | 8/2015 | Karttaavi et al. | |
| 2015/0268045 A1 * | 9/2015 | Dusha .................. | G01C 15/06 33/228 |

(Continued)

*Primary Examiner* — George B Bennett (57) ABSTRACT

An antenna alignment tool and method for use by a user to align a near end antenna to a far end antenna. Embodiments of the tool include an interface, instrumentation, display, control and hands-free attachment structure. The interface receives location information representative of a location of the far end antenna with respect to the near end antenna. The instrumentation provides information representative of the location and orientation of the tool. The control is coupled to the interface, instrumentation and display, and causes the display of orientation information representative of the orientation of the tool with respect to the far end antenna. The hands-free attachment structure attaches the tool to the user's body and within the user's field of view. The user can move his or her body and the alignment tool attached thereto while viewing the orientation information on the display during antenna alignment.

31 Claims, 7 Drawing Sheets

(56) References Cited

U.S. PATENT DOCUMENTS

| | | |
|---|---|---|
| 2016/0036117 A1 | 2/2016 | Whitley et al. |
| 2016/0056525 A1 | 2/2016 | Hansryd et al. |
| 2016/0079651 A1 | 3/2016 | Xu et al. |
| 2016/0218427 A1 | 7/2016 | Derneryd |
| 2016/0380347 A1* | 12/2016 | Grabert .................... H01Q 3/00 33/228 |
| 2017/0155456 A1* | 6/2017 | Wennerlof ............. H04B 17/12 |
| 2018/0145910 A1* | 5/2018 | Mester ................ H04L 45/7453 |
| 2018/0248613 A1* | 8/2018 | Peitzer ............... H04B 7/18506 |

* cited by examiner

ANTENNA ALIGNMENT TOOL AND METHOD

FIELD OF THE INVENTION

The invention relates to tools and methods for aligning antennas used to transmit and receive radio communications.

BACKGROUND

Radio networks use of antennas to transmit and receive the information-carrying radio signals. The antennas are commonly mounted on towers or other structures high above the ground. Many radio systems use directional antennas that are configured to transmit and/or receive radio signals in predetermined directions. When installing directional antennas, it is therefore desirable or necessary to align or orient the antenna. For example, when installing a first or near end antenna that is to transmit and/or receive radio signals from a second or far end antenna, the installer must align the near end antenna with the far end antenna to maximize power transfer of the radio signals.

During antenna installation and alignment, installers often work with their hands and use tools. One known approach for alignment includes connecting the antenna being installed (e.g., the near end antenna) to a radio or other diagnostic equipment capable of providing signal quality metrics, sometimes known as link performance statistics, representative of the quality of the radio signal received from the far end antenna. The location of the far end antenna is typically known to the installer, even if that antenna is beyond the installer's range of sight. The installer manipulates the near end antenna in the general direction of the far end antenna during a coarse alignment phase until the orientation of the near end antenna is sufficiently well aligned with the far end antenna to enable the receipt of radio signals by the diagnostic equipment. An assistant with access to the signal quality metrics from the diagnostic equipment verbally communicates those metrics to the installer. After obtaining coarse alignment, the installer adjusts the antenna over a relatively narrow range of movement during a fine alignment phase in response to the signal quality metrics received from the assistant. Proper alignment is achieved and determined when the signal quality metrics are maximized or optimized. Other methods and tools for antenna alignment are disclosed, for example, in the Hansryd U.S. Patent Application Publication 2016/0056525.

Antenna alignment can be difficult, especially when the antenna is at a location, such as on a tower, that presents limited access to the installer. There remains a need, therefore, for improved antenna alignment methods and tools. Method and tools that can be effectively used directly by the installer would be especially desirable.

SUMMARY

Embodiments of the invention include tools and methods that enable the efficient and accurate alignment of a near end antenna to a far end antenna. One embodiment is an orientation method that comprises attaching an alignment tool including a display to the technician's body by an attachment structure, with the attachment structure enabling hands-free viewing of the display by the technician. Orientation information representative of the orientation of the tool with respect to the location of the far end antenna is displayed on the display. While viewing the orientation information on the display, the technician moves his or her body and the alignment tool attached thereto. Another embodiment is an alignment method that comprises attaching an alignment tool including a display to the user's body by an attachment structure, with the attachment structure enabling hands-free viewing of the display by the technician. Alignment information representative of alignment of the near end antenna with respect to the far end antenna is displayed on the display. While viewing the alignment information on the display, the technician grasps and manipulates the orientation of the near end antenna by hand. Yet another embodiment comprises the technician performing the orientation method followed by the alignment method.

DETAILED DESCRIPTION

Figure 1:
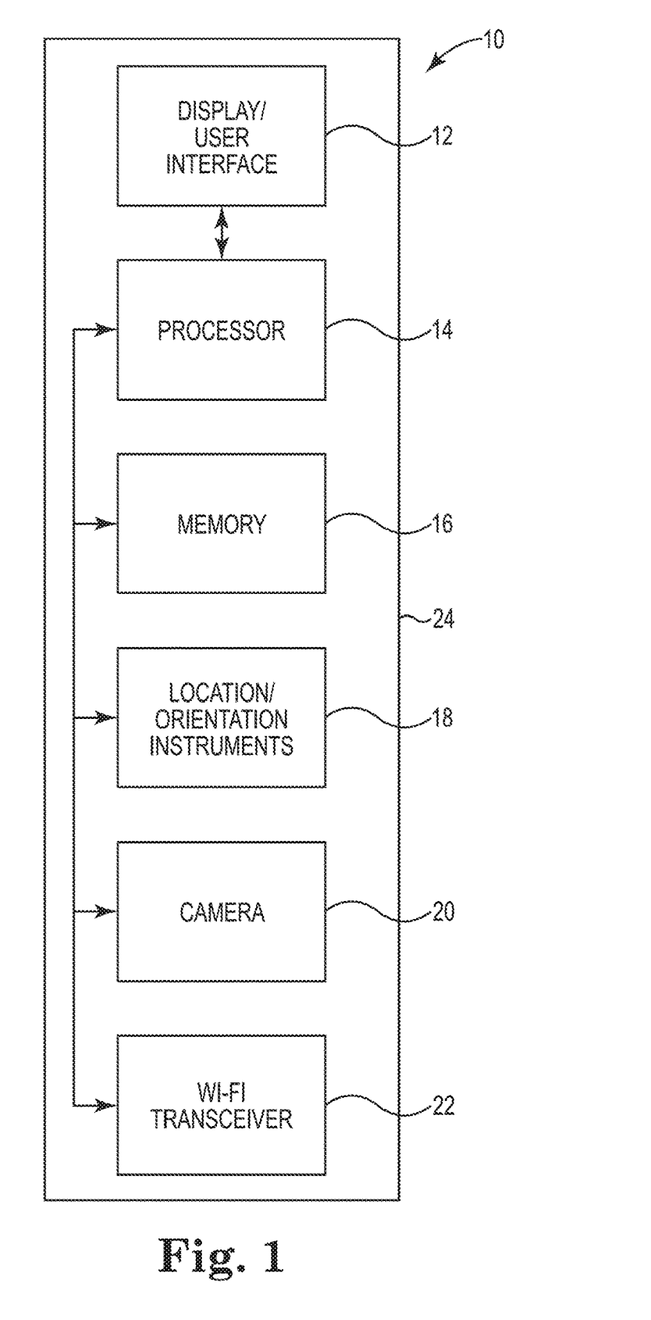
FIG. 1 is block diagram of an alignment tool in accordance with embodiments of the invention.

FIG. 1 is a block diagram of an antenna alignment tool 10 in accordance with embodiments of the invention. As shown, the tool 10 includes display 12, a control such as processor 14 and associated memory 16, location/orientation sensors or instruments 18, camera 20 and wifi transceiver 22, all of which are mounted within an enclosure 24 in the illustrated embodiment. The location/orientation instruments 18 include one or more instruments such as a GPS receiver that provide information representative of the location of the tool (e.g., latitude, longitude and/or altitude), and one or more instruments such as magnetic field sensors or accelerometers that provide information representative of the orientation of the tool (e.g., heading or azimuth (e.g., compass direction)) and/or tilt angle or altitude. Wifi transceiver 22 is an example of a local networking device included in the tool 10. In embodiments, tool 10 is configured as a mobile device such as a smart phone that includes a software application or app stored in the memory and executed by the processor 14. As described in greater detail below, the tool 10 is mounted to the user's or technician's body so that the display/user interface 12 provides a hands-free or heads up display to the technician. The software application is configured to cause the processor 14 to generate, and present on the display/user interface 12, virtual reality or other (e.g., conventional) displays of orientation and/or alignment information that can be used by the technician during the antenna alignment process. The displays are generated using information received from location/orientation instruments 18 and camera 20, and other information that is inputted to the alignment tool 10 (e.g., through the display/user interface 12 and/or wifi transceiver 22).

Figure 2:
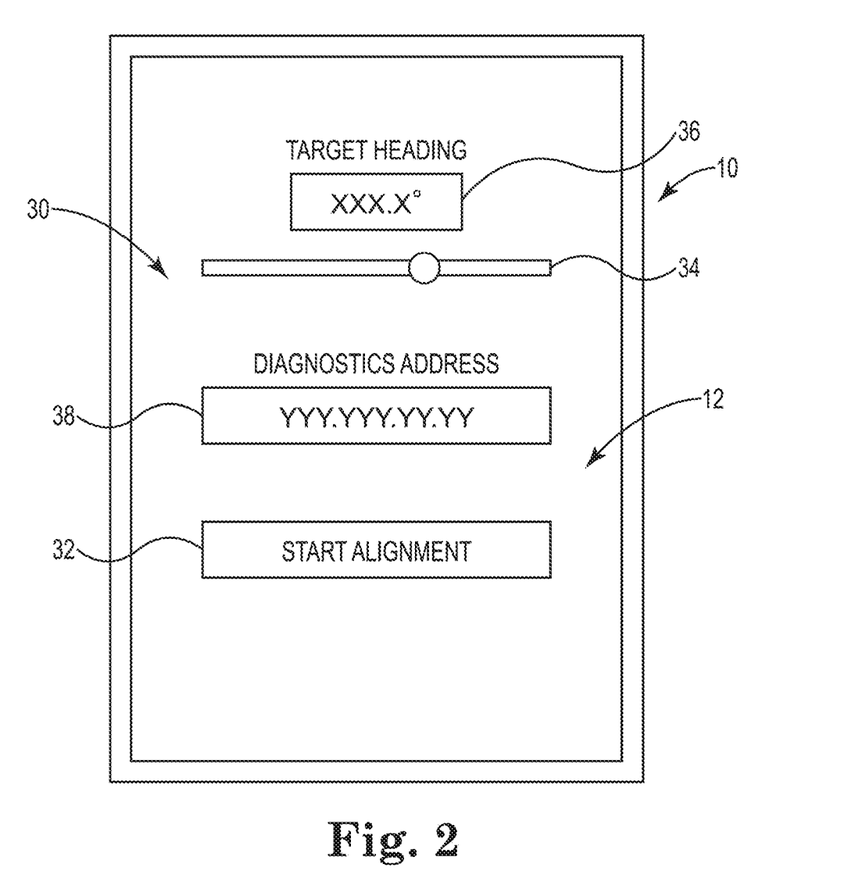
FIG. 2 is an illustration of a configuration menu that can be presented on the display of the alignment tool shown in FIG. 1

Graphical user interfaces that can be used to set up, configure or otherwise operate tool 10 are generated and presented on the display/user interface 12. FIG. 2, for example, is an illustration of the tool 10 with an embodiment of the display/user interface 12 driven by the processor 14 to present a configuration menu 30 and start button 32. The target heading of the far end antenna with respect to the near end antenna being aligned will generally be known to the user, and that or other orientation information can be entered into the tool 10 using the slider bar 34. The heading selected by the technician can be displayed in window 36. Other embodiments (not shown) include other approaches and associated user interfaces to determine the orientation of the far end antenna with respect to the near end antenna. For example, the locations of the near end and far end antennas can be inputted into the tool 10 (e.g., through wifi transceiver 22 or the display/user interface 12) and stored in memory 16, and the tool 10 can calculate the target heading using known approaches. Yet other embodiments of tool 10 (not shown) include a database of antennas and their associated locations, and drop down menus or graphical maps can be presented on the display/user interface 12 for selection by the technician. Again the tool 10 can then calculate the target heading. Although the heading of the far end antenna is used as the orientation information in the illustrated embodiment, other embodiments use other or additional orientation information, such as the tilt angle representing the difference in altitudes between the near end and far end antennas.

Configuration menu 30 also includes an input field 38 for receiving information identifying the diagnostic equipment 40 (which may be a component of a radio) (shown in FIG. 6) to which the near end antenna is connected during the alignment process. As described below, signal quality metrics such as link statistics representative of the quality of a radio signal received by the near end antenna are provided by the diagnostic equipment 40 to the tool 10, and are used by the technician during the installation process. In the illustrated embodiment, the tool 10 is coupled to the diagnostic equipment 40 through the wifi transceiver 22, and the IP address of the diagnostic equipment can be inputted into the input field 38. Other embodiments (not shown) include other approaches for coupling the signal quality metrics information to the diagnostic equipment 40. Examples of signal quality metrics that can be used by the tool 10 include mean squared error (MSE), received signal strength indicator (RSSI), throughput and packet error rate (PER).

Figure 3:
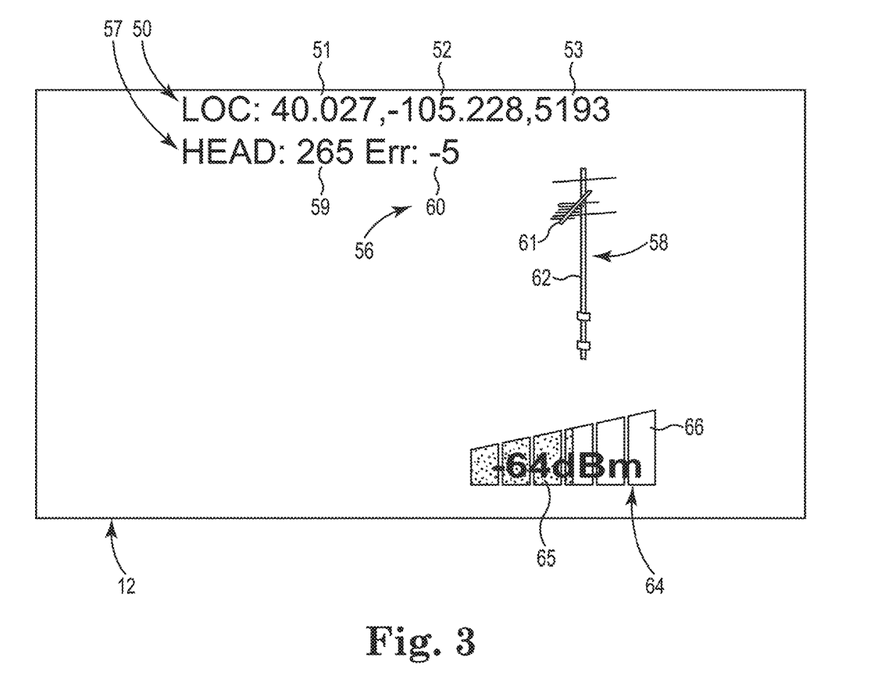
FIG. 3 is an illustration of embodiments of the orientation and alignment displays that can be presented on the display of the alignment tool shown in FIG. 1.

FIG. 3 is an illustration of the types of orientation and/or alignment information that the tool 10 can display to a technician on display/user interface 12 during use of the tool. In the illustrated embodiment the display/user interface 12 includes fields for location display 50, orientation display 56 and alignment display 64. Location display 50 presents location ("LOC") information as latitude 51, longitude 52 and altitude 53 in numerical form the illustrated embodiment. The information presented in the location display 50 is the location of the tool 10, as determined for example by a GPS receiver component of location/orientation instruments 18. The illustrated orientation display 56 includes a numerical display 57 and a pictorial display 58. Numerical display 57 includes both the actual heading ("Head") 59 of the tool 10 and the error ("Err") 60 between the actual heading of the tool and the target heading of the far end antenna (e.g., as input into the tool using the configuration menu 30). Pictorial display 58 includes an indicator such as a graphic representation of an antenna portion 61 on a tower portion 62, where the orientation of the antenna portion rotates with respect to the tower portion to present a visual representation of the magnitude of the error of between the actual heading of the tool 10 and the heading of the far end antenna. In embodiments, the antenna portion 61 can point in the direction that the near end antenna should be turned for alignment. In other embodiments, other or additional types of orientation information, such as the tilt angle of the tool with respect to the far end antenna can be displayed. Other quality metrics such as link margin, errored packets, number of packets and data throughput are displayed in other embodiments.

Alignment display 64 displays information representative of the quality metrics received from the diagnostic equipment 40 (FIG. 6) or other source such as a local or remote database, and includes both a numerical display 65 and a graphical display 66 in the illustrated embodiment. The numerical display 65 presents the RSSI value in decibel-milliwatts (dBm) in the illustrated embodiment. The graphical display 66 is shown as a bar display, with increasing numbers of bars illuminated to represent increasing quality metrics. The colors of the illuminated bars can also change to represent different information. For example, relatively poor signal level quality metrics can be represented by one color (e.g., two or fewer red bars for poor signal level quality metrics, and three or more green bars for acceptable signal level quality metrics). In embodiments, another color such as grey can be used to indicate the last maximum quality metric value that was measured during an alignment process.

Figure 4:
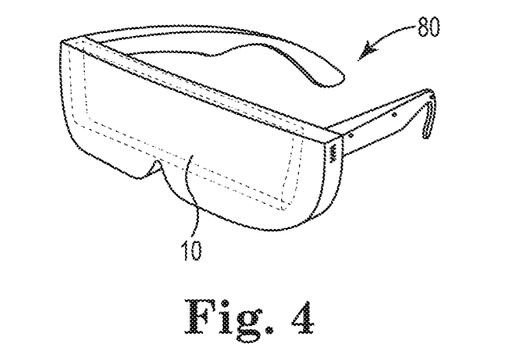
FIG. 4 is an illustration of a virtual reality (VR) or augmented reality (AR) version of the alignment tool shown in FIG. 1 mounted to a headset.
Figure 5:
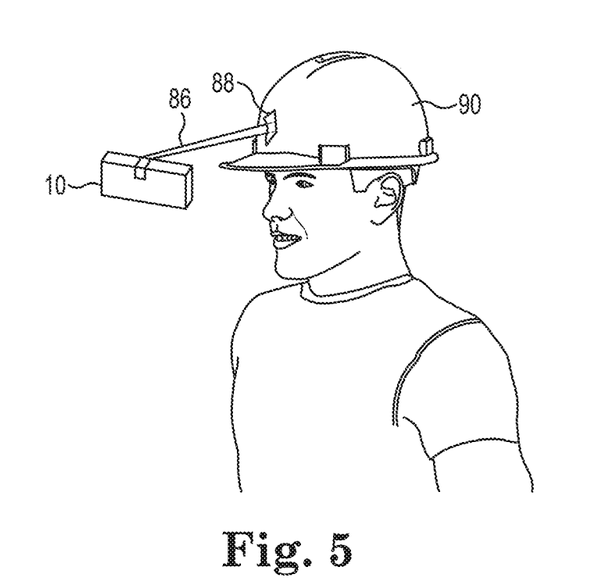
FIG. 5 is an illustration of a selfie stick version of the alignment tool shown in FIG. 1 mounted to a hard hat.

In embodiments, tool 10 is attached to the technician's body to enable viewing of the orientation and/or alignment information presented on the display/user interface 12 (i.e., "head-up" or "hands-free" display and viewing). FIG. 4 is an illustration of a virtual reality (VR) (also known as augmented reality (AR)) headset 80 that can be used to attach the tool 10 to the technician's head and position the display/user interface 12 in the technician's field of view. As described in greater detail below, when tool 10 is used in connection with the VR headset 80, the camera 20 of the tool will produce an image of the field of view in front of the technician, and present that image on the display/user interface 12 along with the location display 50, orientation display 56 and alignment display 64 (i.e., an augmented reality display). FIG. 5 is an illustration of the use of a selfie stick-type device 86 mounted to a mount 88 on a technician's hard hat 90. As shown, the device 86 can be configured to position the tool 10 with the display/user interface 12 in the technician's field of view. Depending on factors such as the technician's preferences, the selfie stick version of tool 10 can, but need not, be operated to have an image generated by the camera 20 presented on the display/user interface 12 along with the orientation and/or alignment information during the use of the tool.

Figure 6:
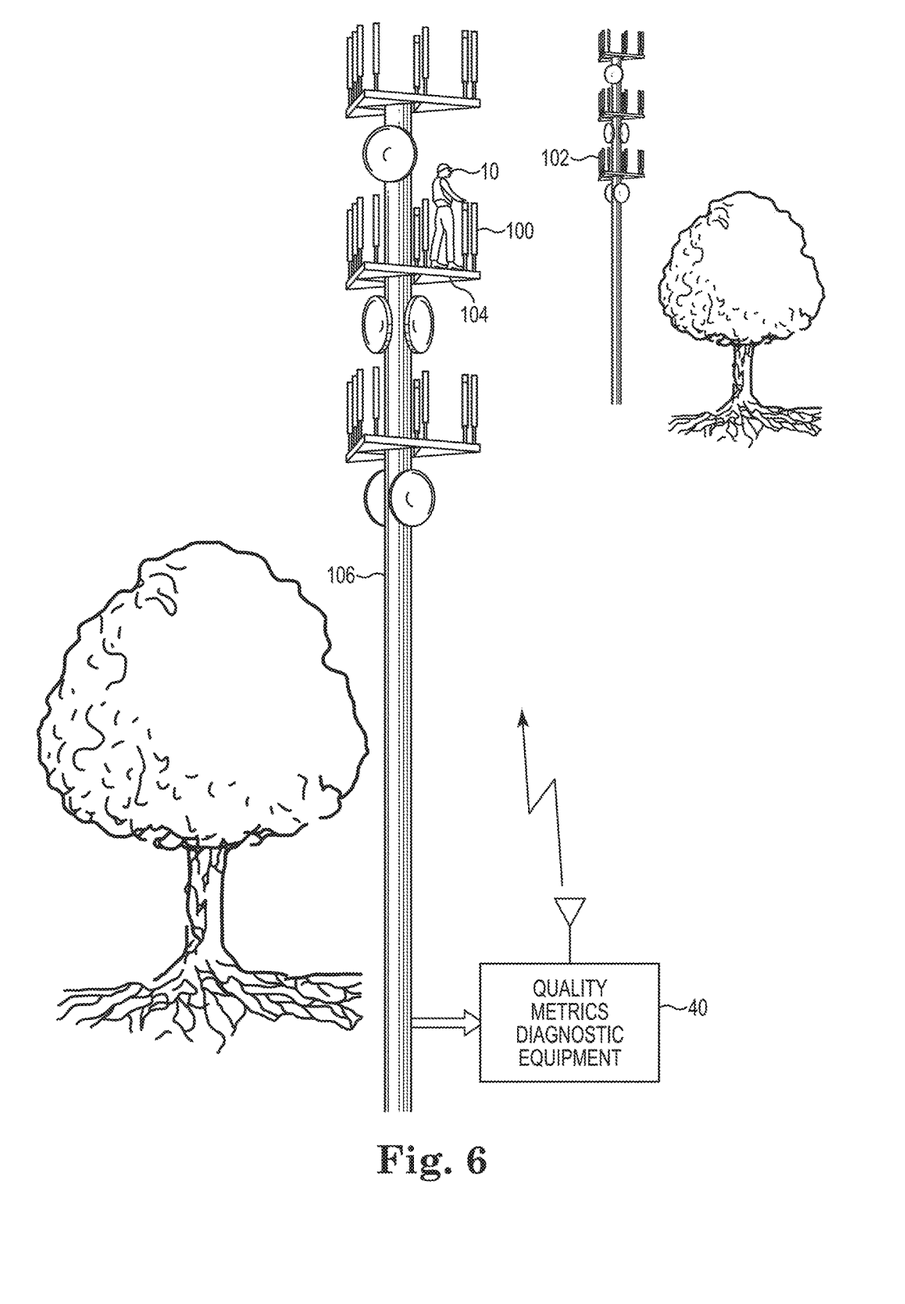
FIG. 6 is an illustration of a technician using the VR version of the alignment tool shown in FIG. 4 to align a near end antenna to a far end antenna by a method in accordance with embodiments of the invention.

FIG. 6 is an illustration of a near end antenna 100 and a far end antenna 102 that can be used in connection with a description of a method for aligning antennas in accordance with embodiments of the invention. As shown, a technician 104 wearing a VR version of tool 10 is located on the tower 106 to which the near end antenna 100 being aligned is mounted. Diagnostic equipment 40 is coupled to the near end antenna 100, and receives quality metrics information associated with the radio signals received by the near end antenna from the far end antenna 102. In the illustrated embodiment, diagnostic equipment 40 transmits the quality metrics information to tool 10 by wifi.

Figure 7A:
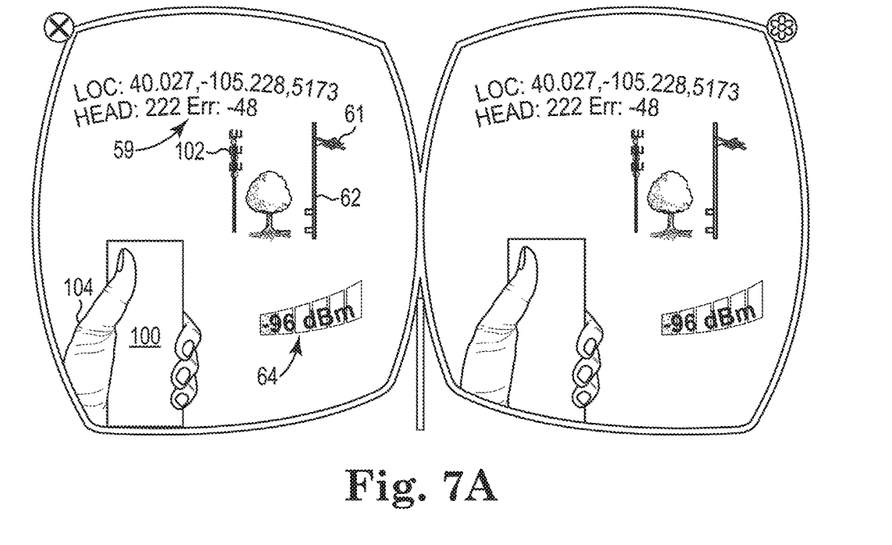
FIGS. 7A-7C are illustrations of embodiments of orientation and alignment displays and images that that are displayed by the VR version of the alignment tool during use of the tool by a method in accordance with embodiments of the invention.
Figure 7B:
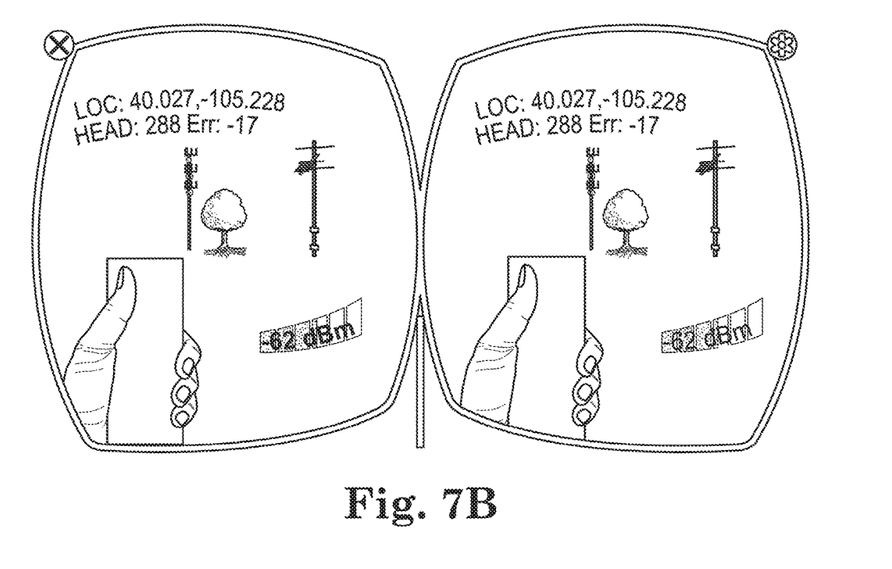
Figure 7C:
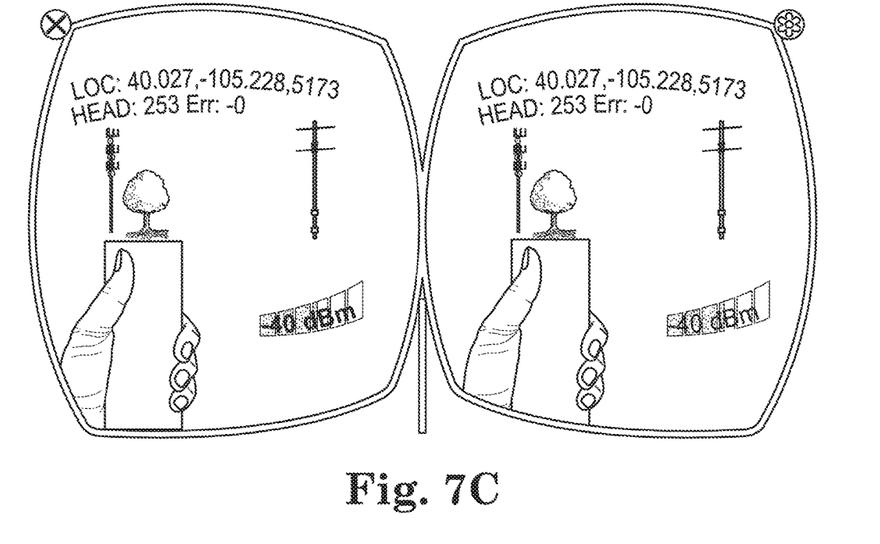

FIGS. 7A-7C are exemplary illustrations of the orientation display 56 and alignment display 64 on the VR versions of tool 10, as well as the image generated by camera 20 (e.g., an AR image including the near end antenna 100 and far end antenna 102), as seen by the technician 104 on display/user interface 12 while using the tool to align the near end antenna with the far end antenna. The hand of technician 104 is also shown in these illustrations, as it happens to be within the field of the image provided by the camera 20.

During a first, coarse, or orientation phase of the alignment process, the technician uses tool 10 and orientation display 56 to orient the near end antenna 100 sufficiently close to the target orientation that the diagnostics equipment 40 is able to provide quality metrics with respect to the desired alignment. During this orientation phase the technician will grasp the antenna 100 and move his or her body and the alignment tool 10 in a direction or heading toward the far end antenna 102. During this movement the technician can view the orientation display 56 to determine whether the direction that the tool 10 is facing corresponds to the desired direction of the far end antenna 102 (e.g., even if the far end antenna is beyond the technician's range of sight). When the technician has determined that the heading of the tool 10 is close to the desired heading of the far end antenna 102, and/or while moving the tool, he or she will manipulate and move the near end antenna 100 to the same direction or heading as the tool. In effect, the technician uses the tool 10 as a sight to determine the general direction of the far end antenna 102, and moves the near end antenna 100 to the direction established by that sight. In embodiments, the accuracy of this orientation phase alignment may be enhanced if the technician is directly behind the near end antenna 100, but the tool 10 and method can be used in connection with this orientation phase alignment with the technician located at other positions with respect to the near end antenna.

FIGS. 7A and 7B illustrate a sequence of outputs provided by the orientation display 56 during an orientation phase of the alignment process. As shown in FIG. 7A, during an initial portion of the orientation phase the heading of the tool 10 on both the numerical display 57 and the pictorial display 58 represent a relatively large error between the target heading toward the far end antenna 102 and the heading of the tool (e.g., the heading error is shown as forty-eight degrees and the antenna portion 61 of the pictorial display is offset by a relatively large amount from the tower portion 62). As indicated by the relatively low value (−96 dBm) of the quality metrics provided by the alignment display 64, the actual alignment of antenna 100 is also poor at the time represented by FIG. 7A. As shown in FIG. 7B, by the orientation phase the technician was able to orient the near end antenna 100 closer to the target heading of the far end antenna 102 (e.g., to within seventeen degrees of the target heading, and as represented by the relatively closer alignment of the antenna portion 61 to the tower portion 62 of the pictorial display 58). By this orientation phase the near end antenna 100 has been move into sufficient (e.g., coarse) alignment with the far end antenna 102 to provide at least sufficient signal coupling between the two antennas to enable use of the quality metrics information on the alignment display 64 (shown as −62 dBm and three and one-half bars in FIG. 7B) for further alignment.

During a second, fine or alignment phase of the alignment process, the technician manipulates the alignment of the near end antenna 100 while viewing the alignment display 64, as shown for example by FIG. 7C. During this alignment phase the technician moves the near end antenna 100 to an orientation that maximizes the signal quality metrics presented on alignment display 64. Alignment display 64 of FIG. 7C represents a relatively well aligned orientation of the antenna 100 (e.g., quality metrics of −40 dBm and six bars).

The selfie stick version of tool 10 shown in FIG. 5 can be used in a manner similar to that of the VR version described above in connection with FIGS. 7A-7C. The image provided by the camera 20 of the selfie stick version of tool 10 can but need not be placed on the display/user interface 12 when using this version of the tool.

Tool 10 and the method of alignment enabled by the tool provide significant advantages. For example, in addition to enabling efficient, accurate and relatively quick alignment, they allow the technician to perform the process without the need for assistants and while allowing the technician to keep his or her hands available for other tasks associated with antenna alignment such as using tools to make adjustments. The tool and method can be especially advantageous when used to align antennas mounted to towers.

Although the present invention is described with reference to preferred embodiments, those of skill in the art will recognize that changes can be made in form and detail without departing from the spirit and scope of the invention. For example, other embodiments of the tool are configured separately from mobile devices (e.g., as a dedicated alignment tool), and include other instruments or local networking devices. In such other embodiments the functions provided by the processor and memory can be provided by firmware or application specific integrated circuits (ASICs). Mobile device embodiments of the tool include other structures and software programs. Although configured and used for both the orientation and alignment phases in embodiments above, other embodiments are configured and used separately for the orientation phase or the alignment phase.

What is claimed is:

1. A method for a user to align a near end antenna to a far end antenna, comprising:
   attaching an alignment tool including a display to the user's body by an attachment structure, wherein the attachment structure enables hands-free viewing of the display by the user;
   displaying on the display alignment information representative of alignment of the near end antenna with respect to the far end antenna; and
   grasping and manipulating the orientation of the near end antenna by hand while viewing the alignment information on the display.

2. The method of claim 1 and further including:
   displaying on the display orientation information representative of the orientation of the tool with respect to the location of the far end antenna; and
   moving the user's body and the alignment tool attached thereto while viewing the orientation information on the display.

3. The method of claim 2 wherein displaying the orientation information includes displaying one or both of (1) the heading of the tool, or (2) an error between the heading of the tool and the location of the far end antenna.

4. The method of claim 2 wherein displaying the orientation information includes displaying an error between the heading of the tool and the location of the far end antenna by one or both of (1) a numerical display, or (2) a pictorial display.

5. The method of claim 2 and further including displaying on the display an image captured by a camera on the tool.

6. The method of claim 5 wherein:
the display includes an augmented reality display; and
the attachment structure includes a headset and attaching the augmented reality display includes attaching the display to the user's head by the headset and in the user's field of view.

7. The method of claim 6 wherein attaching the alignment tool includes attaching a mobile phone that includes the augmented reality display.

8. The method of claim 5 wherein attaching the alignment tool includes attaching a mobile phone that includes the display.

9. The method of claim 3 wherein:
the method further includes coupling the near end antenna to a radio receiver; and
displaying alignment information on the display includes displaying quality metrics information representative of the quality of a radio transmission from the far end antenna that is received at the radio receiver through the near end antenna.

10. The method of claim 9 wherein displaying the quality metrics information includes displaying the information by one or both of (1) a numerical display, or (2) a graphical display.

11. The method of claim 1 wherein the attachment structure is configured to attach the display to the user's head, and attaching the display includes attaching the display to the user's head and in the user's field of view.

12. A method for a user to align a near end antenna to a far end antenna, comprising:
attaching an alignment tool including a display to the user's body by an attachment structure, wherein the attachment structure enables hands-free viewing of the display by the user;
displaying on the display orientation information representative of the orientation of the tool with respect to the location of the far end antenna; and
moving the user's body and the alignment tool attached thereto while viewing the orientation information on the display.

13. The method of claim 12 wherein displaying the orientation information includes displaying an error between the heading of the tool and the location of the far end antenna by one or both of (1) a numerical display, or (2) a pictorial display.

14. The method of claim 12 and further including displaying on the display an image captured by a camera on the tool.

15. The method of claim 14 wherein:
the display includes an augmented reality display; and
the attachment structure includes a headset, and attaching the augmented reality display includes attaching the display to the user's head by the headset and in the user's field of view.

16. The method of claim 15 wherein attaching the alignment tool includes attaching a mobile phone that includes the augmented reality display.

17. The method of claim 14 wherein attaching the alignment tool includes attaching a mobile phone that includes the display.

18. An antenna alignment tool for use by a user to align a near end antenna to a far end antenna, comprising:
an interface to receive location information representative of a location of the far end antenna with respect to the near end antenna;
instrumentation to provide information representative of the location and orientation of the tool;
a display;
a control coupled to the interface, instrumentation and display, to cause the display of orientation information representative of the orientation of the tool with respect to the far end antenna; and
a hands-free attachment structure to attach the tool to the user's body and within the user's field of view.

19. The antenna alignment tool of claim 18 wherein the control causes the orientation information display to include one or both of (1) the heading of the tool, or (2) an error between the heading of the tool and the location of the far end antenna.

20. The antenna alignment tool of claim 18 wherein the control causes the orientation information display to include an error between the heading of the tool and the location of the far end antenna by one or both of (1) a numerical display, or (2) a pictorial display.

21. The antenna alignment tool of claim 18 wherein:
the tool further comprises a camera; and
the control is coupled to the camera and further causes the display of an image captured by a camera.

22. The antenna alignment tool of claim 21 wherein the display is an augmented reality display.

23. The antenna alignment tool of claim 21 wherein the tool is a mobile phone.

24. The antenna alignment tool of claim 18 wherein the user interface is configured to receive (1) the location of the far end antenna, and (2) a heading from the location of the near end antenna and the far end antenna.

25. The antenna alignment tool of claim 18 wherein:
the interface is configured to receive quality metrics information from a radio receiver coupled to the near end antenna; and
the control causes the display of alignment information representative of the quality of a radio transmission from the far end antenna that is received at the radio receiver through the near end antenna.

26. The antenna alignment tool of claim 18 wherein the control causes the display of the alignment information by one or both of (1) a numerical display, or (2) a graphical display.

27. An antenna alignment tool for use by a user to align a near end antenna to a far end antenna, comprising:
an interface configured to receive quality metrics information from a radio receiver coupled to the near end antenna;
a display; and
a control coupled to the interface and display to cause the display of alignment information representative of the quality of a radio transmission from the far end antenna that is received at the radio receiver through the near end antenna; and
a hands-free attachment structure to attach the tool to the user's body and within the user's field of view.

28. The antenna alignment tool of claim 27 wherein the control causes the display of the alignment information by one or both of (1) a numerical display, or (2) a graphical display.

29. The antenna alignment tool of claim 27 wherein:
the tool further comprises a camera; and
the control is coupled to the camera and further causes the display of an image captured by a camera.

30. The antenna alignment tool of claim 29 wherein the display is an augmented reality display.

31. The antenna alignment tool of claim 27 wherein the tool is a mobile phone.

* * * * *